United States Patent
Xin et al.

(10) Patent No.: US 8,948,518 B2
(45) Date of Patent: Feb. 3, 2015

(54) SCALABLE QUERY FOR VISUAL SEARCH

(75) Inventors: Xin Xin, Chicago, IL (US); Zhu Li, Palatine, IL (US); Aggelos K. Katsaggelos, Chicago, IL (US)

(73) Assignee: FutureWei Technologies, Inc., Plano, TX (US)

( * ) Notice: Subject to any disclaimer, the term of this patent is extended or adjusted under 35 U.S.C. 154(b) by 384 days.

(21) Appl. No.: 13/340,389

(22) Filed: Dec. 29, 2011

(65) Prior Publication Data

US 2013/0142439 A1    Jun. 6, 2013

Related U.S. Application Data

(60) Provisional application No. 61/507,972, filed on Jul. 14, 2011.

(51) Int. Cl.
| | | |
|---|---|---|
| G06F 17/30 | (2006.01) | |
| G06K 9/00 | (2006.01) | |
| G06K 9/46 | (2006.01) | |
| G06K 9/62 | (2006.01) | |

(52) U.S. Cl.
CPC ...... *G06F 17/30256* (2013.01); *G06K 9/00979* (2013.01); *G06K 9/4671* (2013.01); *G06F 17/30247* (2013.01); *G06K 9/6211* (2013.01)
USPC ............................ 382/201; 382/190; 382/195

(58) Field of Classification Search
None
See application file for complete search history.

(56) References Cited

U.S. PATENT DOCUMENTS

| | | | |
|---|---|---|---|
| 4,020,463 A * | 4/1977 | Himmel ........................ 382/242 |
| 6,584,221 B1 * | 6/2003 | Moghaddam et al. ........ 382/165 |
| 6,671,407 B1 | 12/2003 | Venkatesan et al. | |
| 6,859,802 B1 * | 2/2005 | Rui ....................................... 1/1 |
| 6,963,863 B1 * | 11/2005 | Bannon ................................. 1/1 |
| 7,949,186 B2 * | 5/2011 | Grauman et al. ............. 382/170 |
| 8,488,883 B2 * | 7/2013 | Gutelzon et al. ............. 382/176 |
| 8,548,193 B2 * | 10/2013 | Saund et al. .................. 382/103 |
| 8,687,891 B2 * | 4/2014 | Takacs et al. ................. 382/190 |
| 2005/0213818 A1 | 9/2005 | Suzuki et al. | |
| 2007/0071290 A1 * | 3/2007 | Shah et al. .................... 382/118 |

(Continued)

FOREIGN PATENT DOCUMENTS

WO         2010055399 A1    5/2010

OTHER PUBLICATIONS

Bay, H., et al, "Speeded-Up Robust Features (SURF)", www.sciencedirect.com; Computer Visiion and Image Understanding, vol. 110 (2008), pp. 346-359.

(Continued)

*Primary Examiner* — Chan Park
*Assistant Examiner* — Iman K Kholdebarin
(74) *Attorney, Agent, or Firm* — Slater & Matsil, L.L.P.

(57) ABSTRACT

A system and a method for progressive queries, which are a sequence of queries for visual search of an image, sent from a sender to a receiver of a communication network, are disclosed. Queries based on a set of feature points and their associated locations of an image may be selected in sequence. A sender sends a first query to a receiver, wherein the first query comprises a number of feature points which is a subset of the set of feature points of the image invariant to rotation and scaling in creating the image. The sender receives a feedback from the receiver, wherein the feedback is generated by the receiver based on searching an image repository using information from the first query. The sender then decides whether there is a match of the image in the image repository based on the received feedback.

17 Claims, 4 Drawing Sheets

(56) References Cited

U.S. PATENT DOCUMENTS

| | | | |
|---|---|---|---|
| 2007/0217676 A1* | 9/2007 | Grauman et al. | 382/170 |
| 2008/0270378 A1* | 10/2008 | Setlur et al. | 707/5 |
| 2009/0022472 A1* | 1/2009 | Bronstein et al. | 386/52 |
| 2009/0290752 A1* | 11/2009 | Kalva | 382/100 |
| 2010/0067799 A1* | 3/2010 | Liu et al. | 382/190 |
| 2011/0026781 A1* | 2/2011 | Osadchy et al. | 382/118 |
| 2011/0116690 A1 | 5/2011 | Ross et al. | |
| 2011/0135166 A1* | 6/2011 | Wechsler et al. | 382/118 |
| 2011/0158533 A1* | 6/2011 | Gutelzon et al. | 382/176 |
| 2013/0016908 A1* | 1/2013 | Xin et al. | 382/191 |
| 2013/0016912 A1* | 1/2013 | Li et al. | 382/197 |
| 2013/0121598 A1* | 5/2013 | Xin et al. | 382/201 |
| 2013/0142439 A1* | 6/2013 | Xin et al. | 382/201 |
| 2014/0016830 A1* | 1/2014 | Wang et al. | 382/115 |
| 2014/0222783 A1* | 8/2014 | Chang et al. | 707/722 |

OTHER PUBLICATIONS

"International Search Report," International Application No. PCT/US2012/046760, Applicant: Huawei Technologies Co., Ltd., mailing date: Oct. 16, 2012, 2 pages.

International Search Report and Written Opinion of the European Patent Office Searching Authority received in Patent Cooperation Treaty Application No. PCT/US2012/046760, mailed Jun. 25, 2014, 8 pages.

Lowe, D.G., "Object Recognition from Local Scale-Invariant Features," The Proceedings of the Seventh IEEE International Conference on Computer Vision, 1999, vol. 2, 8 pages.

Zickler, S. et al., "Detection and Localization of Multiple Objects," 2006 6th IEEE-RAS International Conference on Humanoid Robots, Dec. 4-6, 2006, 6 pages.

* cited by examiner

SCALABLE QUERY FOR VISUAL SEARCH

This application claims the benefit of U.S. Provisional application No. 61/507,972, filed on Jul. 14, 2011, entitled "System and Method for Scalable Transmission and Verification Schemes for Visual Search," which application is hereby incorporated herein by reference in its entirety.

TECHNICAL FIELD

The present invention generally relates to image processing; and more specifically, to image query constructions with applications in visual search.

BACKGROUND

Modern-era mobile phones, handsets, tablets, mobile terminals, mobile devices, or user equipments have evolved into powerful image- and video-processing devices, equipped with high-resolution cameras, color displays, and hardware-accelerated graphics. With the explosive growth of mobile devices, like android, iPhone, mobile based multimedia visual services are enjoying intense innovation and development. Application scenarios of mobile visual search services can be location based services, logo search, and so on, where one image or multimedia sent from a mobile device is matched to another one stored in a database or an image repository. First deployments of mobile visual-search systems include Google Goggles, Nokia Point and Find, Kooaba, and Snaptell.

The image queries sent by mobile devices through a wireless network are usually computationally expensive, requiring prohibitively high communication cost, and cannot support real time operations. In popular applications where a mobile device captures a picture of certain objects and sends it as a query over a wireless network to search a large repository, reducing the bit rate while preserving the matching accuracy is a main concern and a main focus of the standardization effort under MPEG.

Visual descriptors or image descriptors can be used as queries instead of an image for visual search purposes. However, for mobile devices, visual descriptors are usually still very heavy as they comprise of hundreds or thousands of scale and rotation invariant feature points, as well as their locations. An example feature point of scale-invariant feature transform (SIFT) comprises of 128 dimension with 2048 bits. Another example feature point of speeded up robust features (SURF) comprises of 64 dimension with 1024 bits. Reducing the size of the feature points may compromise the performance of the searching and matching accuracy in visual search services.

On the other hand, a point set of the images instead of the complete image may be sent by a mobile device to search the image repository. A point set may be sent at the same time or separately from sending the feature points of an image for visual search. Therefore a point set can be used to search and match images in visual search as well, in addition to the feature point search.

It is still a main concern for reducing the bit rate while preserving the matching accuracy with the use of feature points and point sets.

SUMMARY

The above-identified deficiencies and drawback of current searching mechanisms is overcome through example embodiments of the present invention. For example, embodiments described herein provide for constructing progressive queries in visual search applications. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

With explosive growth of visual content repository in the Internet, a system that can support query-by-capture over the wireless link becomes attractive in a number of visual search applications. In this disclosure, systems, apparatuses, computer program products, and methods for constructing progressive queries in visual search applications are presented. Progressive queries are a sequence of queries of an image, sent from a sender to a receiver of a communication network. Progressive queries of an image may be constructed based on the representation of the set of feature points and their associated locations of an image. Each query is transferred through the network individually and matched to the image repository. It may be possible that a match of the image is found by the first query or some query in the sequence without completely sending the complete set of feature points.

In accordance with an example embodiment, a method for processing an image by a sender of a network is provided. The sender may be a user equipment (UE) or a base station (eNB) of a wireless network. The sender may send a first query of the image to a receiver, wherein the first query comprises a first number of feature points which is a subset of a first set of feature points of the image invariant to rotation and scaling in creating the image. The sender may receive a feedback from the receiver, wherein the feedback is generated by the receiver based on searching an image repository using information from the first query. The sender then decides whether there is a match of the image in the image repository based on the received feedback. The sender may send a second query of the image to the receiver when the sender decides there is no match of the image in the image repository based on the first query, wherein the second query comprises a second number of feature points which is a subset of the first set of feature points of the image invariant to rotation and scaling in creating the image. The first query and second query may be disjoint without any common feature point.

In accordance with another example embodiment, a method for processing an image by a sender of a network is provided. The sender may send a first query of the image to a receiver, wherein the first query comprises a first number of feature points which is a subset of a first set of feature points of the image invariant to rotation and scaling in creating the image. The first set of feature points may be a scale-invariant feature transform (SIFT) feature points of the image or a speeded up robust features (SURF) feature points of the image. The first query may comprise of feature points which are compressed by a dimension reduction method, a hashing/quantization method, or an adaptive quantization method. The first query may be selected randomly from feature points located in a sub-region of the image after a spatial partition of the image. The first query may also be selected based on Laplacian values of feature points located in a sub-region of the image after a spatial partition of the image. The spatial partition of the image may be centered at a centroid of associated location points of the first set of feature points and performed in a same way as a quad tree partition of the image.

In accordance with an example embodiment, a method for processing an image by a sender of a network is provided. The sender may send a first query of the image to a receiver, and receive a feedback from the receiver. The feedback may be a vector of the first number of bits with a second number of bits set to indicate matched feature points, where the first query comprises the first number of feature points, among which the receiver has found the second number of matched feature points from the image repository. The sender may decide there is a match of the image in the image repository when the ratio of the second number with the first number is larger than a threshold, where the threshold is generated based on information about the image repository.

In accordance with an example embodiment, a method for processing an image by a sender of a network is provided. The sender may send a first query of the image to a receiver, and receive a feedback from the receiver. The sender may receive a first feedback which is a vector of the first number of bits with a second number of bits set to indicate matched feature points, where the first query comprises the first number of feature points, among which the receiver has found the second number of matched feature points from the image repository. The sender may receive a second feedback which is a topological information related to a point set associated with the second number of matched feature points. For example, the second feedback may be a topologically encoded vector, which is a graph spectrum of the point set associated with the second number of matched feature points. The sender may then decide there is a match of the image in the image repository when the ratio of the second number with the first number is larger than a threshold, where the threshold is generated based on information about the image repository, and the topologically encoded vector received in the second feedback matches a topologically encoded vector generated by the sender from associated positions of the matched second number of feature points.

In accordance with an example embodiment, a method for processing an image by a receiver of a network is provided. The receiver receives a first query of the image from a sender, wherein the first query comprises a first number of feature points which is a subset of a first set of feature points of the image invariant to rotation and scaling in creating the image. The receiver may send a first feedback to the sender, wherein the feedback is generated by the receiver based on searching an image repository using information from the first query. The first feedback may be a vector of the first number of bits with a second number of bits set to indicate matched feature points, where the first query comprises the first number of feature points, among which the receiver has found the second number of matched feature points from the image repository. The receiver may also send a second feedback to the sender which is a topological information related to a point set associated with the second number of matched feature points.

In accordance with an example embodiment, an apparatus for processing an image is disclosed. The apparatus may comprise a transmitting unit configured to send a first query of the image, wherein the first query comprises a first number of feature points which is a subset of a first set of feature points of the image invariant to rotation and scaling in creating the image; a receiving unit configured to receive a feedback, wherein the feedback is generated based on searching an image repository using information from the first query; and a decision unit configured to decide whether there is a match of the image in the image repository based on the received feedback. The apparatus may further comprise a query selection unit configured to select the first query from the first set of feature points of the image, wherein the selection is performed randomly or based on Laplacian values of feature points, on feature points located in a sub-region of the image after a spatial partition of the image. The decision unit is configured to decide there is a match of the image in the image repository when a ratio of a second number with the first number is larger than a threshold, where there are the second number of matched feature points from the image repository among the first number of feature points of the first query, and the threshold is generated based on information about the image repository.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understand that these drawings depict only typical embodiments of the invention; and are not, therefore, to be considered limiting of its scope. For a more complete understanding of the present invention, and the advantages thereof, reference is made herein to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As will be more fully explained below, embodiments of systems, apparatuses, computer program products, and methods for constructing progressive queries, which may be a sequence of queries for visual search of an image, sent from a sender to a receiver of a communication network, are disclosed. Instead of sending an entire image, a complete set of feature points, or their associated positions, as one query for visual search applications, a sequence of queries based on the representation of the set of feature points and their associated locations may be sent in sequence. Each query may be transferred through the network individually and matched to the image repository. It may be possible that a match of the image is found by the first query or some query in the sequence without completely sending the complete set of feature points.

Figure 1A:
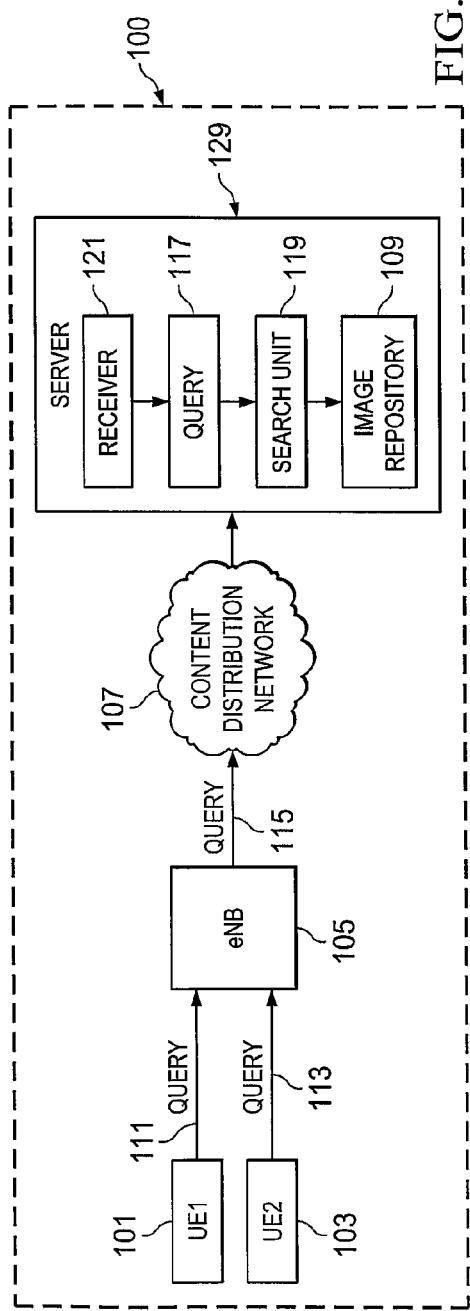
FIGS. 1($a$) and 1($b$) illustrate an example of a content distribution network and a visual search system with mobile devices in accordance with example embodiments described herein.

FIG. 1(a) illustrates an example embodiment of visual search system where a mobile device or a user equipment (UE) UE1 101 or UE2 103 sends multimedia queries 111 or 113 through a base station 105 and a content distribution network (CDN) 107. The terms mobile phones, handsets, tablets, mobile terminals, mobile devices, or user equipments are used in an interchangeable way. The queries 111, 113 are received by a receiver 121 within the server 129 as the query 117, which is used by a search unit 119 to search in an image repository 109. The UE1 101, UE2 103, or the base station eNB 105 may be collectively referred to as clients and the server 129 comprising the receiver 121, the search unit 119, and the image repository 109 may be collectively referred to as a server 129.

The visual search system may be location based services, logo search, and so on. The UEs 101 and 103 may be connected to base stations eNB 105 through wireless communication channels. The UEs 101 and 103 may be a mobile phone, a user terminal, mobile station, iPHONE, or any other similar devices. There may be a different number of UEs connected to the base station eNB 105. A UE 101 or 103 may send a plurality of queries to the base station.

Figure 1B:
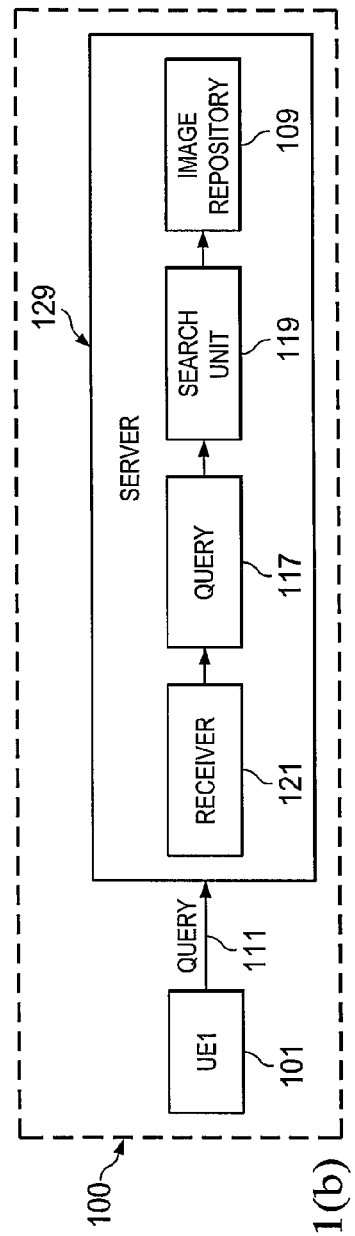

The UEs 101, 103, the base station 105, and the CDN 107 may be part of a Long Term Evolution (LTE) wireless system, a Long Term Evolution Advanced (LTE-A) system, an IEEE802.16m system, or any other kind of wireless system. The visual search system illustrated in FIG. 1(a) may be implemented in other ways, and represented in an abstract level illustrated in FIG. 1(b) according to an example embodiment, where a UE1 101 is connected to a sever 129 including an image repository 109, and UE1 101 sends a query 111 received by the server 129 as 117 query received by the receiver 121, which is used to search the image repository 109 within a server 129.

The query 111 or 113 are sent from the UEs 101 or 103 to a base station 105. The base station 105 may directly transfer the query 111 or 113 as the query 115 to the server as the query 117 received by the server. The base station 105 may perform certain operations on the query 111 or 113 to generate a different query 115 and send the query 115 through the CDN 107 and received by the server as 117 received query.

If the query 111 sent from the UE 101 and the received query 117 are an image, the image query may be used to search and match to images stored in the database or image repository 109. Typically, this is accomplished using special index structures. The image based queries are usually computationally expensive, requiring additional prohibitive communication cost, and cannot support real time operation required by CDN applications.

The query 111 or the query 117 may be visual descriptors. Visual descriptors or image descriptors are descriptions of the visual feature points of the contents in images, videos or in components or modules that produce such descriptions. They can describe elementary characteristics such as the shape, the color, the texture, or the motion, among others, and they allow the quick and efficient searches of the audio-visual content. High discriminating descriptors include speeded up robust features (SURF) and scale-invariant feature transform (SIFT), which are robust image detectors and descriptors. In visual search applications, the matching ability of the descriptors of the query image to the descriptors of the database image is critical to a successful matching.

Visual descriptors may represent visual objects and points of interest as a set of feature points, which may be scale and rotation invariant, or any other properties. When visual descriptors are used to match images, the received query 117 may be a set of feature points extracted from an image. A collection of these feature points and their topological information, such as a set of feature points $\{F_k|k=1, \ldots, n\}$ where each feature point $F_k$ located in image position $\{x_k, y_k\}$, gives unique representation of certain objects invariant to scale, rotation, and some degree of view angle changes. A feature point may be represented as $F_k$, or $F_j$, or some other similar variables. The set may consist of hundreds (e.g, 242) of feature points. Matching two images are equal to matching two sets of feature points in the images and the number of matched features is used as an indicator for match.

A feature point $F_j$ is a point in $R^{n_j}$, where $n_j$ is the dimension of the feature point $F_j$, and a feature dimension $i \epsilon R^{n_j}$ for the feature point $F_j$ has a $p_i$ bit precision represented by $p_i$ bits. This may be called the resolution of the feature point at the dimension i. For a set of feature points, the feature point in the set may have the same dimension or different dimensions.

However, for mobile devices, visual descriptors are usually still very heavy as they comprise of hundreds of scale and rotation invariant feature points, as well as their locations. An example feature point of scale-invariant feature transform (SIFT) comprises of 128 dimension with 2048 bits. Another example feature point of speeded up robust features (SURF) comprises of 64 dimension with 1024 bits. Reducing the size of the feature points may compromise the performance of the searching and matching accuracy in visual search services.

The query 111 or the query 117 may be a point set of the image instead of the complete image or a visual descriptor, sent by a mobile device to search the image repository. A point set may be sent at the same time or separately from sending the feature points of an image for visual search. Therefore a point set can be used to search and match images in visual search as well, in addition to the feature point search. A point set can be used to search and match images in visual search independently, without being used together with the feature points.

Figure 2:
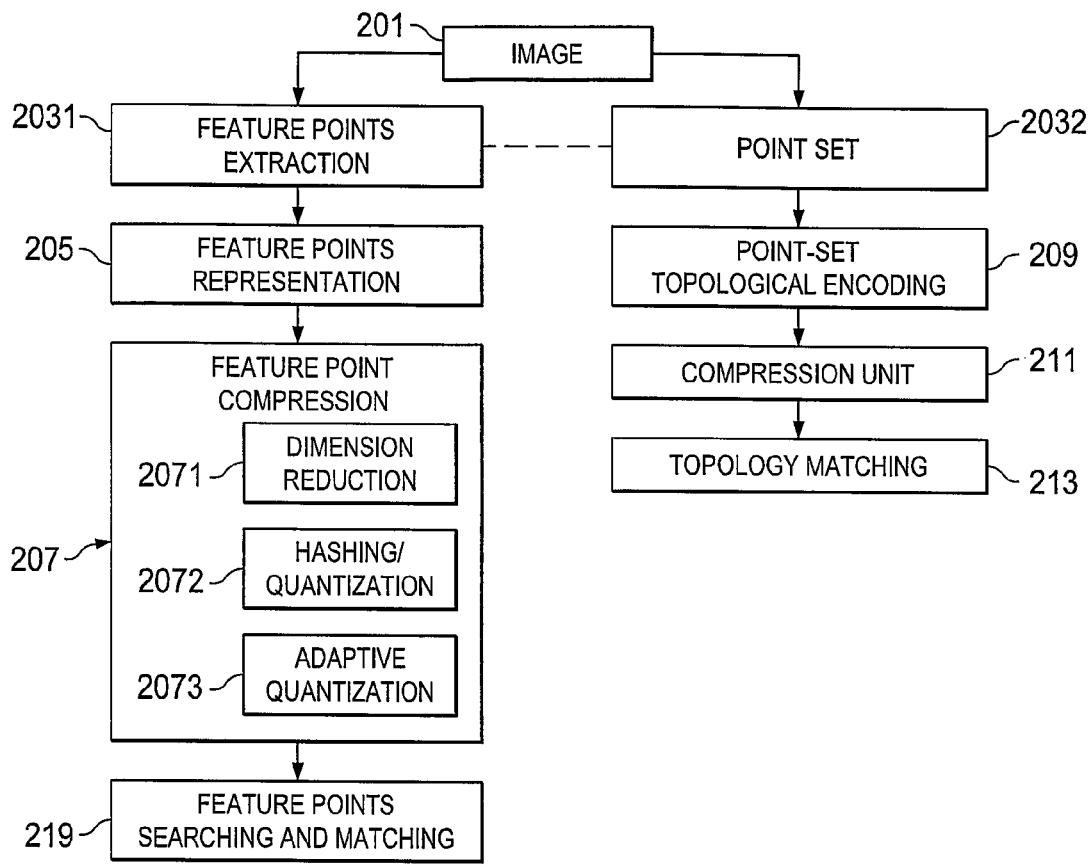
FIG. 2 illustrates an example sequence of operations performed on an image to represent an image by a point set and a set of feature points, which are used to perform visual search in accordance with example embodiments described herein.

FIG. 2 illustrates an example embodiment of operation flow for using a set of feature points or a point set to represent an image for visual search. The operations illustrated in FIG. 2 may be performed by a mobile device, a base station, and a server, or by the combination those components, or any other components in a network.

An image is provided at step 201. At step 2031, a set of feature points may be extracted from the image using repeatable feature extractors performed by a mobile terminal or a base station. When a set of a collection of scale and rotation invariant feature points such as SURF and SIFT feature points are used as visual descriptors, those feature points are found in a visual object by edge detection across multiple scales. As an example embodiment, only those points with strong edge info consistent across scale are selected to be feature points. Rotation invariance is achieved by descriptor that describes the edge orientations. A feature point set may comprise of hundreds of scale and rotation invariant feature points. The locations at the image for a set of feature points are called the associated locations of the set of feature points. A location may be the associated position for a feature point of the set of feature points. Other visual descriptor feature points may be extracted as well instead of SURF or SIFT. The use of SURF and SIFT are for illustration purposes only and are not limiting.

At step 205, feature points are represented, for example, various feature points such as SURF and SIFT feature points are represented in different ways. For example, each feature point of SURF is 128 dimensions with 2048 bits. A feature point of SIFT, on the other hand, has 64 dimension with 1024 bits. The high dimensionality of feature points makes a large scale visual object and point of interest repository search ineffective, as typical indexing schemes fails with high dimension.

Therefore a compression of the feature points may be needed to reduce the bit rate. As an example embodiment, at step 207, a feature points compression operation is performed that reduces the size of representation. The compression operation may be performed by a feature point compression unit. The feature point compression unit may be located on the terminal, or on the base station. The compressed feature points are transmitted to the server end which will process the search and return the result back to the mobile terminal.

There may be different approaches to reduce the size of the feature points in step 207, such as a dimension reduction performed by a unit 2071, a hashing/quantization performed by a unit 2072, or an adaptive quantization performed by a unit 2073. These different methods may be combined to perform on the same set of feature points to achieve further reductions.

Dimension Reduction Methods use dimension reduction approaches to reduce feature point dimensions while preserving certain information. Hashing methods try to use an index for each feature point. With certain conditions, input feature points are mapped into a certain bucket with less resolutions. All points in the bucket are viewed as the match. Locality sensitive hashing, spectral hashing and vector quantization fall into this category. Adaptive quantization further maps each feature point to different resolutions. For example, a feature point has a first precision for a first dimension and a second precision for a second dimension. The adaptive quantization may be done based on certain criteria such as the variance for the feature points. In some embodiments, a feature point has a first precision for a first dimension and a second precision for a second dimension, wherein the first precision for the first dimension with a higher variance for the feature point is more than the second precision for the second dimension with a lower variance for the feature point.

At step 219, the compressed feature points are used to search and match an image repository to find the right match of images represented by the feature points. The operation may be performed by a server or some other network components.

In addition to the use of feature points for visual search, other point sets can be used for visual search as well. According to another embodiment, illustrated in FIG. 2, the image is provided at step 201. At step 2032, a point set may be extracted from the image. As an example, the point set may be extracted related to a set of feature points such as SURF and SIFT, performed by a mobile device or a base station. A feature point set may comprise of hundreds of scale and rotation invariant feature points, as well as their locations in the original image. The locations of the set of feature points in the original image may be the point set generated in step 2032. Other visual descriptor feature points may be extracted as well instead of SURF or SIFT. The use of SURF and SIFT are for illustration purposes only and are not limiting. Other point sets of the image may be used as well in step 2032 instead of locations for SURF or SIFT feature points.

At step 209, a topologically encoded vector of the point set is generated, for example, a topological encoding unit may be used to generate a topologically encoded vector of the point set generated in step 203. The topologically encoded vector for the image is invariant to rotation and scaling in creating the image, and is generated based on the topological information of the point set. As an example embodiment, the topologically encoded vector may be a graph spectrum of a pair-wise location distance matrix generated from the point set of the image. For example, the topologically encoded vector may be calculated as an eigen value of a Laplacian matrix L=S−W, where W is an affinity matrix defined by $w_{j,k}=e^{-a\|X_j-X_k\|}$, $\|X_j-X_k\|$ is a distance between a first point $x_j$ and a second point $x_k$ of the point set of the image.

At step 211, the topologically encoded vector of the point set is compressed to generate a compressed vector, for example, a compression may be performed by a compression unit using a compression method which compresses the topologically encoded vector of the point set to generate a compressed vector. As an example, the compression method may be a discrete cosine transform (DCT). There may be other compression methods used as well. There may be multiple compression methods used in sequence to compress the topologically encoded vector of the point set.

At step 213, the compressed topologically encoded vector of the point set may be used to search a matched image. A server or some other network component may extract the topologically encoded vector of the point set and match it to another topologically encoded vector of another point set of another image, and determine two images are a match when certain properties are satisfied for the topologically encoded vectors.

Operations illustrated in FIG. 2 are only for illustration purposes and are not limiting. According to an embodiment, the operations performed may follow the sequence illustrated or follow a different sequence. For example, the compression unit 211 may not be used when sending the topologically encoded vector of the point set. As another example embodiment, the step 207 may perform one or more operations selected from 2071 dimension reduction, 2072 hashing/quantization, or 2073 adaptive quantization. The point set extracted in step 2032 and the feature point set extracted in step 2031 may be done at the same time, and the point set in 2032 is the associated point set of the feature point set representing the locations of the feature points at step 2031. An image may be represented by various formats of a set of feature points, point sets, or combination of both.

Figure 3:
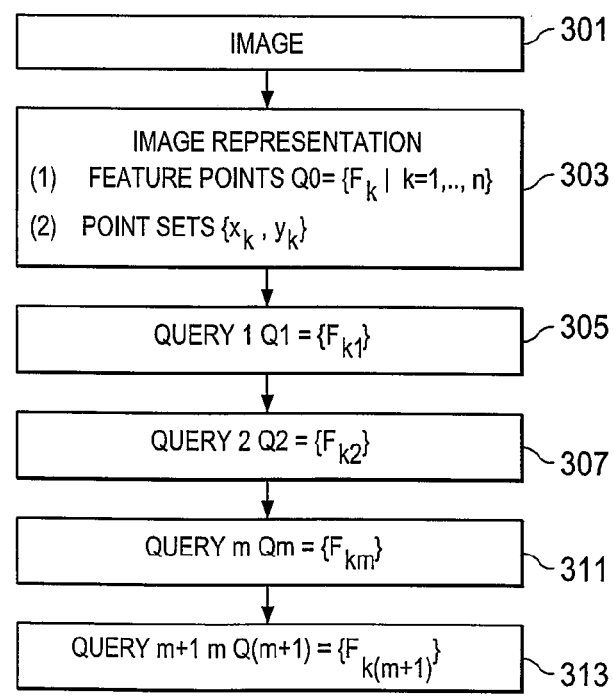
FIG. 3 illustrates an example process for constructing a sequence of multiple queries for visual search using a set of feature points and a point set in accordance with example embodiments described herein.

FIG. 3 illustrates an embodiment of operation flow for constructing progressive queries, which are a sequence of queries, for visual search of an image. Sending all feature points of an image over the network as a query may not be necessary for many of the visual search applications. For example, images of size 1024*768 can have up to 1500 features. Only some of the feature points are useful for successful image retrieval. Instead of sending an entire image, a complete set of feature points, or their associated positions, as one query, a sequence of queries based on the representation of the set of feature points and their associated locations may be sent in sequence. Each query is transferred through the network individually and matched to the image repository stored in a server. It may be possible that a match of the image is found by the first query or some query in the sequence without completely sending the complete set of feature points. More details of the operations are illustrated below.

An image is provided at step 301. The image may be captured by a mobile device and sent to an eNB or a server. At step 303, the image may be represented by a set of feature points, for example, $Q_0=\{F_k|k=1, \ldots, n\}$, and a point set $\{x_k, y_k\}$, using the techniques illustrated in FIG. 2. It may be possible that both the feature points and some kind of compressed feature points are available at step 303, using various techniques illustrated in FIG. 2. Some function unit may exist to generate a compressed feature points from the feature points available at step 303. A feature point may mean a compressed feature point.

The point set available at step 303 may be the associated point set $\{x_k, y_k\}$ of the set of feature points $Q_0=\{F_k| k=1, \ldots, n\}$ as the locations of the feature points. Based on the set of feature points and its associated point set, the mobile device or the base station constructs a sequence of queries to search and match the image from an image repository which may be stored in a server.

As an example embodiment, queries illustrated in step 305 to step 313 as $Q_1$ to $Q_{m+1}$ are progressive queries, each comprising some feature points from the set of feature points $Q_0=\{F_k|k=1, \ldots, n\}$ illustrated in step 303, which is divided into a sequence of subsets $Q_1$ to $Q_{m+1}$. For some embodiments, the subsets may be disjoint from each other $Q_i \cap Q_j = \emptyset$. For example, the point set division and the subset of feature point division may be by hierarchical quad-tree partition of the point set. For some other embodiments, the subsets may have non-empty intersection sets $Q_i \cap Q_j \neq \emptyset$. In order to perform a visual search of the image in a progressive manner, a subset of $Q_i$ comprising $n_i$ feature points is sent in iteration i to search the image repository. When there is no match found, the next iteration $Q_{i+1}$ comprising $n_{i+1}$ feature points is sent in iteration i+1.

Two different ways may be illustrated to select the feature point set $Q_i$ from the original feature point set $Q_0$. The first way may randomly select some feature points after spatial partition. For all the feature points, the centroid of all the associated location points of the feature points is found. Then the whole image region centered at the centroid of the associated location points is partitioned into four regions in the same way as the quad tree partition. At each sub region, location points are randomly selected and the feature points for the selected location points are chosen for the feature point set $Q_i$.

The second way may select feature points based on Laplacian values. For all the feature points, the centroid of all the associated location points of the feature points is found. Then the whole image region centered at the centroid of the associated location points is partitioned into four regions in the same way as the quad tree partition. At each sub region, the Laplacian value $D(x, y, \sigma)$ of a feature point $(x,y)$ is calculated as follows $D(x, y, \sigma)=L(x, y, k\sigma)-L(x, y, \sigma)$, where $L(x, y, k\sigma)$ is the convolution of the original image $I(x, y)$ with the Gaussian blur $G(x, y, k\sigma)$ at scale $k\sigma(k>1)$, that is, $L(x, y, k\sigma)=G(x, y, k\sigma)*I(x, y)$. $D(x, y, \sigma)$ therefore represents the second derivative of a feature point. The greater the value of $D(x, y, \sigma)$ the more robust the feature point is. Therefore a number of feature points may be selected when they have bigger Laplacian values.

According to an embodiment, all the queries $Q_i$ may be constructed at the same time, with the spatial partition of the image process. If they are constructed at the same time, they will be stored in a storage for later retrieval. The queries $Q_i$ may be constructed one at a time, generated when needed.

Figure 4A:
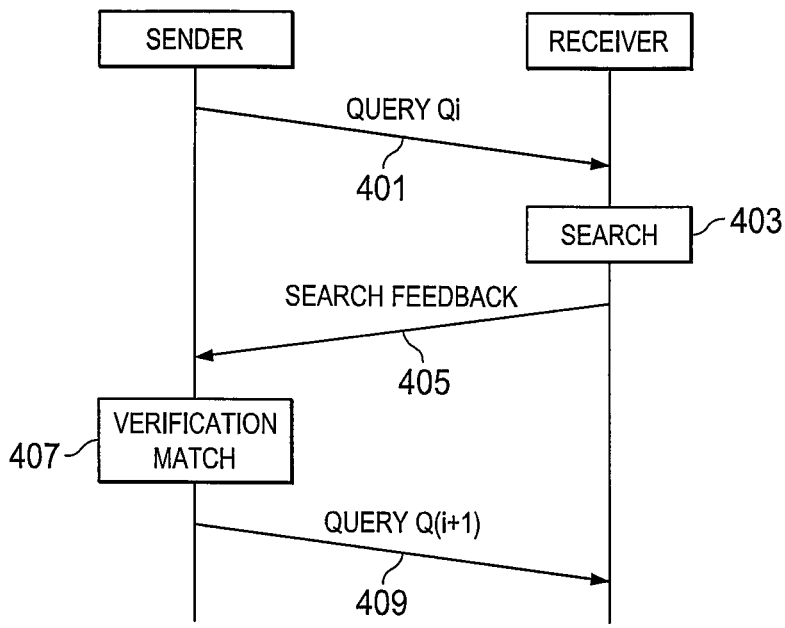
FIGS. 4($a$) and 4($b$) illustrate an example protocol for matching two images represented by a sequence of queries in accordance with example embodiments described herein.
Figure 4B:
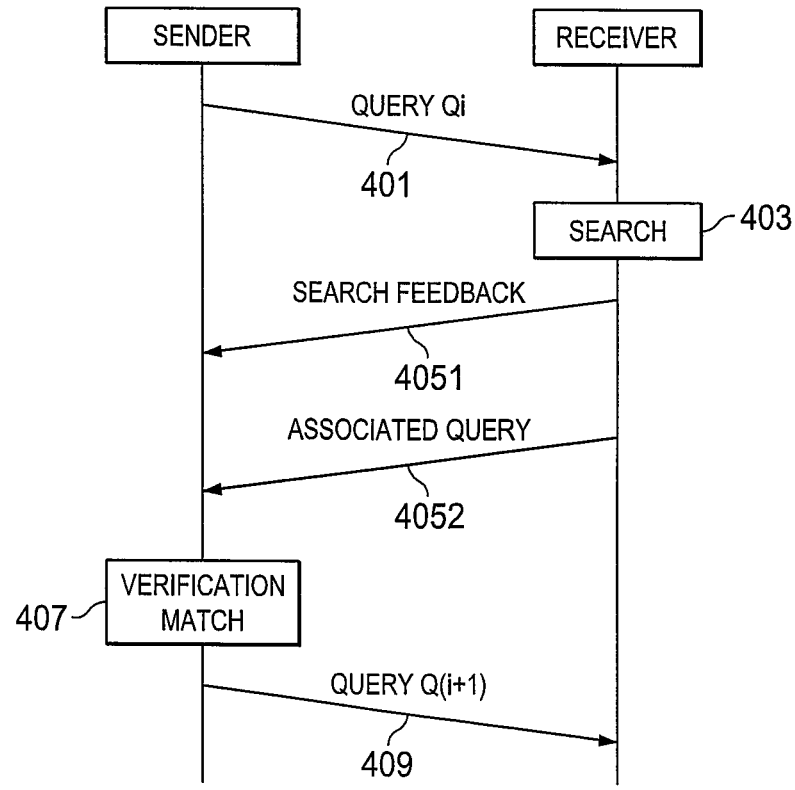

FIGS. 4(a) and 4(b) illustrate example embodiments of protocol for sending a sequence of progressive queries for visual search of an image. A sender sends a sequence of queries to a receiver in FIGS. 4(a) and 4(b). The sender may be a UE or a base station. The receiver may be a base station or the server. The sender or the receiver may be other network components as well to perform the visual search to match an image with another stored in an image repository, where the image repository is accessible by the receiver to perform the search. Furthermore, according to an embodiment, the idea illustrated in FIGS. 4(a) and 4(b) may be used in settings not in a network, but within one single computer or any other computing devices, where the sender and the receiver may be implemented by different software or hardware components within the computer or any other computing devices.

Illustrated in FIG. 4(a), at a moment i, the sender may send a query $Q_i$ which comprises a subset of feature points at step 401. The query $Q_i$ may be constructed as illustrated in FIG. 3. As an example embodiment, all the $Q_i$ may be constructed together at the same time before the sending of the first query. The sender may also construct one $Q_i$ at a time when needed following the operation flow illustrated in FIG. 3.

When the receiver receives the query $Q_i$, at step 403, it searches the image repository for a set of matched feature points stored in the image repository or generated from images stored in the repository. For example, the $Q_i$ may comprise $n_i$ feature points, and as an example, the receiver may be able to match $m_i$ out of the $n_i$ feature points. The image repository may store many images that are used to match the searched image. The images stored in the image repository may be stored in complete image. The image repository may store additional feature points in addition or separately from the image itself. The feature points may be stored ahead of time or generated when the search is performed.

The receiver sends back a feedback information at step 405 to indicate the search result. According to an embodiment, the feedback information may be a vector indicating how many matched feature points have been found in the image repository. For example, the feedback information may be a vector of $n_i$ bits, with $m_i$ bits set to 1 to indicate a match. The feedback information may be a vector of $n_i$ bits, with $m_i$ bits set to 0 to indicate the number of matched feature points. The use of bit 1 or bit 0 to indicate match may be agreed upon by the sender and the receiver.

When the sender receives the feedback information, at step 407, it decides whether a match of the image has been found in the image repository, for example, based on the number of matched feature points. In an embodiment, the sender may simply calculate the ratio of $m_i/n_i$, and to compare the ratio with a threshold to decide whether to declare a match of the image. The threshold for deciding such a match may be generated from the image repository ahead of the time. For example, if the ratio $m_i/n_i$ is bigger than the threshold, the sender may declare a match of the searched image, and stop sending any further queries.

If the sender at step 407 decides that there is no match of the searched image yet, the sender may send the next query $Q_{i+1}$ at the next step 409. The receiver receives the query $Q_{i+1}$ and follows the same pattern as already illustrated. Such process may continue until all the queries have been sent, or until a match is found.

At step 405, the receiver may send a different feedback information from the one illustrated in FIG. 4(a). According to an embodiment, in FIG. 4(b), the feedback 4051 is the feedback illustrated in FIG. 4(a), which, for example, may be a vector of $n_i$ bits, with $m_i$ bits set to 1 to indicate a match. According to another embodiment, the receiver may send some additional feedback information as 4052, which, for example, may be an associated query of the 401 query. The associated query 4052 may be related to the associated point set of the matched feature points of the query. The associated query may be a topologically encoded vector of the point set of the $m_i$ matched feature points, or the point set itself, or other topological information. The operation of generating such a topologically encoded vector was illustrated in step 209 in FIG. 2. The topologically encoded vector for the image is invariant to rotation and scaling in creating the image, and for example, is generated based on the topological information of the point set. The topologically encoded vector may be a graph spectrum of a pair-wise location distance matrix generated from the point set associated with the matched feature points.

As illustrated in FIG. 4(b), when the sender receives the feedback information, at step 407, it decides whether a match of the image has been found, for example, based on the number of matched feature points. The sender may first calculate the ratio of $m_i/n_i$, and to compare the ratio with a threshold to decide whether to declare a match of the image. The threshold for deciding such a match may be generated from the image repository ahead of the time. If the ratio $m_i/n_i$ is less than the threshold, the sender may declare no match of the searched image, and send another query. For example, if the ratio $m_i/n_i$ is larger than the threshold, then the sender may compare the topologically encoded vector received, which is received as the associated query, with one to be generated from the associated locations of the $m_i$ feature points. The two topologically encoded vectors may be matched if their distance is smaller than a second threshold. The second threshold for deciding such a match may be generated from the image repository ahead of the time. The added match of the topologically encoded vectors received as the associated query may increase matching accuracy. In general, the sender may use the received associated query from the receiver to verify certain additional image properties at the sender side to increase the matching accuracy.

Continuing in FIG. 4(b), if the sender at step 407 decides that there is no match of the searched image yet, the sender may send the next query $Q_{i+1}$ at the next step 409. The receiver receives the query $Q_{i+1}$ and follows the same pattern as already illustrated. Such process may continue until all the queries have been sent, or until a match is found.

Protocols showing in FIGS. 4(a) and 4(b) are only for illustration purposes and are not limiting. Other forms of queries can be sent and different matching can be performed. For example, the sender may send the 401 query $Q_i$ in addition to a topologically encoded vector, and the search 403 may be performed using both the feature points set $Q_i$ and the topologically encoded vector to improve matching accuracy.

Other forms of feedback may be sent by the receiver to the sender. For example, a receiver may make decisions different from the ones instead of the ones illustrated in FIGS. 4(a) and 4(b). For example, the receiver, which may be the server, may decide a matched image has been found using the queries, instead of decided by the sender, the mobile terminal, or the base station. If the server decides whether there is a match of the searched image in the image repository and sends back the feedback results to the sender, the sender may simply accepts the server's decision feedback as its own decision.

Other forms of decisions may be made by the sender upon receiving the feedback from the receiver. For example, if the server decides whether there is a match of the searched image in the image repository and sends back the feedback results to the sender, then the sender may still decide the match, which would be simply to check the feedback result from the receiver.

Figure 5:
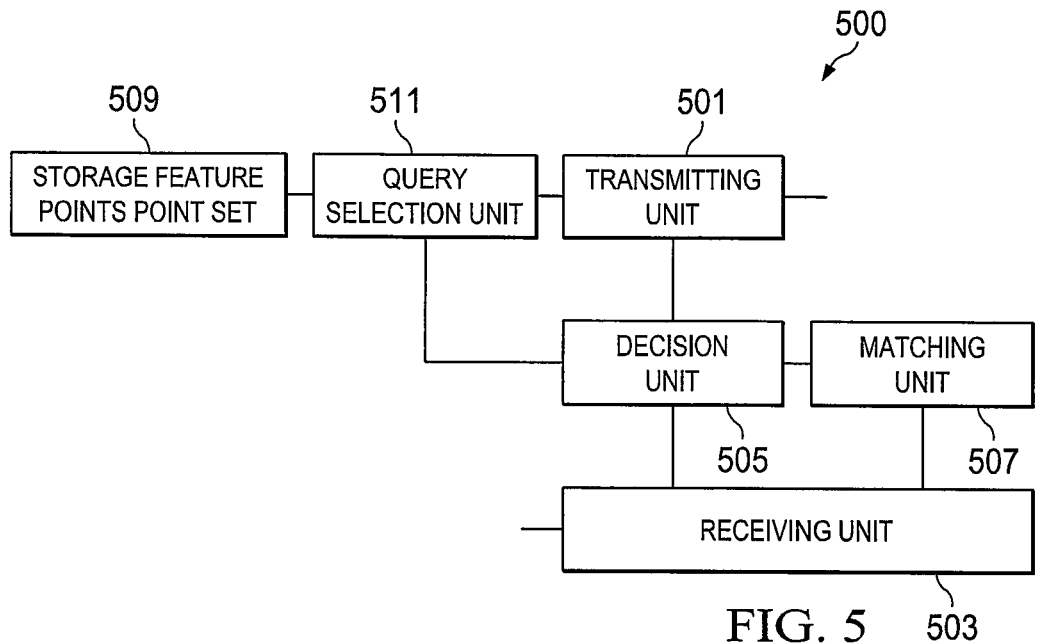
FIG. 5 illustrates an example apparatus for visual search using a sequence of multiple queries in accordance with example embodiments described herein.

FIG. 5 illustrates an embodiment apparatus 500 to perform visual search using progressive queries. The apparatus may comprise a transmitting unit 501, a receiving unit 503, a decision unit 505, a matching unit 507, a storage unit 509, and a query selection unit 511.

For the embodiment illustrated, the transmitting unit 501 is configured to send a query of the image, wherein the query comprises a first number of feature points which is a subset of a first set of feature points of the image invariant to rotation and scaling in creating the image. The first set of feature points of the image may be stored in the storage unit 509. According to an example embodiment, the query may be selected by the query selection unit 511 based on the number of iterations of queries have been sent, for example, wherein the selection is performed randomly or based on Laplacian values of feature points, on feature points located in a sub-region of the image after a spatial partition of the image.

The receiving unit 503 is configured to receive a feedback, wherein the feedback is generated based on searching an image repository using information from the query. The feedback may be sent by a server, or some other network component or other searching component. The decision unit 505 is configured to decide whether there is a match of the image in the image repository based on the received feedback. If the feedback contains some additional associated query, then the matching unit 507 may perform matching verification based on the received associated query. When the received associated query is a topologically encoded vector, the matching unit 507 may match the received topologically encoded vector with one to be generated from the associated locations of the feature points. The two topologically encoded vectors may be matched if their distance is smaller than a second threshold. The second threshold for deciding such a match may be generated from the image repository ahead of the time. The added match of the topologically encoded vectors received as the associated query may increase matching accuracy. In general, the sender may use the received associated query from the receiver to verify certain additional image properties at the sender side to increase the matching accuracy.

As an example embodiment, based on the feedback received, the decision unit 505 may decide there is a match of the image in the image repository, for example, when a ratio of a second number with the first number is larger than a threshold, where there are the second number of matched feature points from the image repository among the first number of feature points of the query, and the threshold is generated based on information about the image repository.

Figure 6:
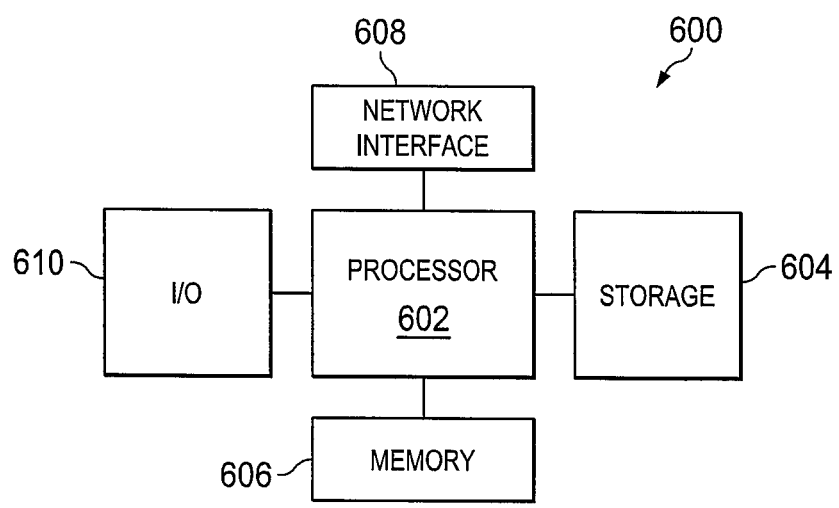
FIG. 6 illustrates an example implementation of a method in accordance with example embodiments described herein.

Through the descriptions of the preceding embodiments, the present disclosure may be implemented by using hardware only or by using software and a necessary universal hardware platform. FIG. 6 illustrates one example of a unit or a controller 600 according to an embodiment of the invention. Unit 600 may be used in conjunction with and may perform the functions described in the disclosure. In the same or alternative embodiments, controller 600 may reside at, be component of, or may be used by one or more UEs, eNBs, servers, or any other network devices or components.

The unit 600 may contain a processor 602 that controls the overall operation of the controller 600 by executing computer program instructions which define such operation. Processor 602 may include one or more central processing units, read only memory (ROM) devices and/or random access memory (RAM) devices. The processor 602 may be an ASIC, a general purpose processor, a Digital Signal Processor, a combination of processors, a processor with dedicated circuitry, dedicated circuitry functioning as a processor, and a combination thereof.

The computer program instructions may be stored in a storage device 604 (e.g., magnetic disk, database, etc.) and loaded into memory 606 when execution of the computer program instructions is desired. Thus, applications for performing the herein-described method steps, such as precoding, scheduling, transmitting and receiving data can be defined by the computer program instructions stored in the memory 606 or storage 604 and controlled by the processor 602 executing the computer program instructions.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 606 may store the software for the controller 600, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

The unit 600 may also include one or more network interfaces 608 for communicating with other devices via a network. In wireless portions of the network, the network interface could include an antenna and associated processing. In wired portions of the network, the network interface could include connections to the cables that connect the unit to other units. In either case, the network interface could be thought of as circuitry for accessing the physical communications portions (such as the antenna).

The unit 600 could also include input/output devices 610 (e.g., display, keyboard, mouse, speakers, buttons, etc.) that enable user interaction with the controller 600. These user I/O devices are optional and not needed if the unit 600 is accessed by the network interfaces only.

An implementation of unit 600 could contain other components as well, and that the controller of FIG. 6 is a high level representation of some of the components of such a controller for illustrative purposes.

Embodiments of the present disclosure provide a number of new and advantageous features. For example, one embodiment provides a new visual feature description compression scheme that achieves very high accuracy at very low bit rate. Another embodiment provides a compression scheme that is scalable in bit rate and accuracy. Embodiments of the present invention can be used in a variety of products, processes and services. Some examples of these implementations include Cloud Based Media Processing, Next gen CDN product, CDN measure and operations. Embodiments are desirable because they can provides real-time, low computation/communication cost Quality of Experience (QoE) estimation at the client. For example, a robust QoE estimator with light weight video signature and minimum cost in computing and communication resources can be achieved. This would be useful in the CDN and wireless multi-media market.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A method for processing an image by a sender, the method comprising:
    sending a first query of the image to a receiver, wherein the first query comprises a first number of feature points which is a subset of a first set of feature points of the image invariant to rotation and scaling in creating the image;
    receiving feedback from the receiver, wherein the feedback is generated by the receiver based on searching an image repository using information from the first query;
    deciding whether there is a match of the image in the image repository based on the received feedback;
    sending by the sender a second query of the image to the receiver when the sender decides there is no match of the image in the image repository based on the first query, wherein the second query comprises a second number of feature points which is a subset of the first set of feature points of the image invariant to rotation and scaling in creating the image, and wherein the first query and second query are disjoint without any common feature point; and
    deciding there is a match of the image in the image repository when a ratio of a second number with the first number is larger than a threshold, where there are the second number of matched feature points from the image repository among the first number of feature points of the first query, and the threshold is generated based on information about the image repository.

2. The method of claim 1, wherein the first set of feature points is a scale-invariant feature transform (SIFT) feature points of the image or a speeded up robust features (SURF) feature points of the image.

3. The method of claim 1, wherein the sender is a user equipment (UE) or a base station (eNB) of a wireless network.

4. The method of claim 1, wherein the first query comprises of feature points which are compressed by a dimension reduction method, a hashing/quantization method, or an adaptive quantization method.

5. The method of claim 1, wherein the first query is selected randomly from feature points located in a sub-region of the image after a spatial partition of the image.

6. The method of claim 1, wherein the first query is selected based on Laplacian values of feature points located in a sub-region of the image after a spatial partition of the image.

7. The method of claim 5, wherein the spatial partition of the image is centered at a centroid of associated location points of the first set of feature points and performed in a same way as a quad tree partition of the image.

8. The method of claim 1, wherein the feedback is a vector of a first number of bits with a second number of bits set to indicate matched feature points, where the first query comprises the first number of feature points, among which the receiver has found the second number of matched feature points from the image repository.

9. The method of claim 8, wherein the sender decides there is a match of the image in the image repository when the ratio of the second number with the first number is larger than a threshold, where the threshold is generated based on information about the image repository.

10. The method of claim 1, wherein:
the sender receives a first feedback which is a vector of a first number of bits with a second number of bits set to indicate matched feature points, where the first query comprises the first number of feature points, among which the receiver has found the second number of matched feature points from the image repository; and
the sender receives a second feedback which is a topological information related to a point set associated with the second number of matched feature points.

11. The method of claim 10, wherein the second feedback is a topologically encoded vector, which is a graph spectrum of the point set associated with the second number of matched feature points.

12. The method of claim 11, wherein the sender decides there is a match of the image in the image repository when the ratio of the second number with the first number is larger than a threshold, where the threshold is generated based on information about the image repository; and the topologically encoded vector received in the second feedback matches a topologically encoded vector generated by the sender from associated positions of the matched second number of feature points.

13. A method for processing an image by a receiver, the method comprising:
receiving a first query of the image from a sender, wherein the first query comprises a first number of feature points which is a subset of a first set of feature points of the image invariant to rotation and scaling in creating the image;
sending a first feedback to the sender, wherein the feedback is generated by the receiver based on searching an image repository using information from the first query;
receiving a second query of the image from the sender when the sender decides there is no match of the image in the image repository based on the first query, wherein the second query comprises a second number of feature points which is a subset of the first set of feature points of the image invariant to rotation and scaling in creating the image, and wherein the first query and second query are disjoint without any common feature point; and
deciding there is a match of the image in the image repository when a ratio of a second number with the first number is larger than a threshold, where there are the second number of matched feature points from the image repository among the first number of feature points of the first query, and the threshold is generated based on information about the image repository.

14. The method of claim 13, wherein the first feedback is a vector of a first number of bits with a second number of bits set to indicate matched feature points, where the first query comprises the first number of feature points, among which the receiver has found the second number of matched feature points from the image repository.

15. The method of claim 14, further comprising:
sending a second feedback to the sender which is a topological information related to a point set associated with the second number of matched feature points.

16. An apparatus for processing an image, the apparatus comprising:
a processor; and
a computer readable storage medium storing programming for execution by the processor, the programming including instructions to:
send a first query of the image, wherein the first query comprises a first number of feature points which is a subset of a first set of feature points of the image invariant to rotation and scaling in creating the image;
receive a feedback, wherein the feedback is generated based on searching an image repository using information from the first query;
decide whether there is a match of the image in the image repository based on the received feedback;
send a second query of the image when the decision unit determines that there is no match of the image in the image repository based on the first query, wherein the second query comprises a second number of feature points which is a subset of the first set of feature points of the image invariant to rotation and scaling in creating the image, and wherein the first query and second query are disjoint without any common feature point, and
decide there is a match of the image in the image repository when a ratio of a second number with the first number is larger than a threshold, where there are the second number of matched feature points from the image repository among the first number of feature points of the first query, and the threshold is generated based on information about the image repository.

17. The apparatus of claim 16, wherein the programming further comprises instructions to select the first query from the first set of feature points of the image, wherein the selection is performed randomly or based on Laplacian values of feature points, on feature points located in a sub-region of the image after a spatial partition of the image.

* * * * *